(12) United States Patent
Ghosh et al.

(10) Patent No.: US 9,930,660 B2
(45) Date of Patent: Mar. 27, 2018

(54) SCHEDULING TRIGGER FRAMES IN A HIGH EFFICIENCY WIRELESS LOCAL-AREA NETWORK

(71) Applicant: Intel IP Corporation, Santa Clara, CA (US)

(72) Inventors: Chittabrata Ghosh, Fremont, CA (US); Laurent Cariou, Portland, OR (US)

(73) Assignee: Intel IP Corporation, Santa Clara, CA (US)

(*) Notice: Subject to any disclaimer, the term of this patent is extended or adjusted under 35 U.S.C. 154(b) by 42 days.

(21) Appl. No.: 14/862,202

(22) Filed: Sep. 23, 2015

(65) Prior Publication Data

US 2016/0353434 A1   Dec. 1, 2016

Related U.S. Application Data

(60) Provisional application No. 62/167,379, filed on May 28, 2015.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0007* (2013.01); *H04W 52/0209* (2013.01);
(Continued)

(58) Field of Classification Search
CPC ............... H04W 52/325; H04W 72/04; H04W 72/0413; H04W 72/042; H04W 72/044;
(Continued)

(56) References Cited

U.S. PATENT DOCUMENTS 7,457,973 B2 * 11/2008 Liu ................... H04W 52/0216
370/229
7,899,451 B2 * 3/2011 Hu ........................ H04W 48/17
370/328
(Continued)

OTHER PUBLICATIONS

Agarwal et al., IEEE P802.16m/D9: Draft Amendment to IEEE Standard for Local and metropolitan area networks: Part 16: Air Interface for Broadband Wireless Access Systems, Oct. 6, 2010, IEEE.*

*Primary Examiner* — Eric Nowlin
(74) *Attorney, Agent, or Firm* — Schwegman Lundberg & Woessner, P.A.

(57) ABSTRACT

Apparatuses, computer readable media, and methods for scheduling trigger frames in a high-efficiency wireless (HEW) local-area network are disclosed. An apparatus of a HEW master station is disclosed. The HEW master station includes transceiver circuitry and processing circuitry configured to transmit a random access trigger frame (TF-R) to a plurality of HEW stations, and receive resource requests from one or more of the plurality of HEW stations in response to the TF-R. The transceiver circuitry and processing circuitry is further configured to transmit an indication when a trigger frame is to be transmitted. The trigger frame is to comprise resource allocations in response to the resource requests. An apparatus of a HEW station may enter a power save mode until a time when a trigger frame is scheduled that includes resource allocations in response to resource requests transmitted to a master station from the HEW station.

23 Claims, 4 Drawing Sheets (51) Int. Cl.
　　　*H04W 74/08*　　(2009.01)
　　　*H04W 84/12*　　(2009.01)
　　　*H04W 52/02*　　(2009.01)
　　　*H04W 72/12*　　(2009.01)
　　　*H04W 74/00*　　(2009.01)

(52) U.S. Cl.
　　　CPC ..... *H04W 74/002* (2013.01); *H04W 74/0833* (2013.01); *H04W 52/0216* (2013.01); *H04W 72/1205* (2013.01); *H04W 84/12* (2013.01); *Y02B 60/50* (2013.01)

(58) Field of Classification Search
　　　CPC ......... H04W 72/0446; H04W 72/0453; H04W 72/1289; H04W 74/004; H04W 74/006; H04W 74/04; H04W 74/0833; H04W 84/12; H04W 88/08; H04W 52/0216; H04W 52/0219; H04W 52/0235; H04W 74/002; H04W 74/06; H04W 74/08; H04L 5/0007; H04L 5/0094
　　　See application file for complete search history.

(56) References Cited

U.S. PATENT DOCUMENTS

| | | | | |
|---|---|---|---|---|
| 8,014,323 B2* | 9/2011 | Wentink | ............... | H04W 74/06 370/278 |
| 8,085,698 B2* | 12/2011 | Wentink | ............... | H04L 1/1664 370/311 |
| 8,326,372 B2* | 12/2012 | Raissinia | .......... | H04W 52/0216 370/311 |
| 8,526,346 B1* | 9/2013 | Liu | ................... | H04W 52/0229 370/311 |
| 9,001,720 B2* | 4/2015 | Wentink | ............ | H04W 52/0216 370/311 |
| 9,148,856 B2* | 9/2015 | Wentink | ............ | H04W 52/0216 |
| 9,591,573 B2* | 3/2017 | Wentink | ............ | H04W 52/0216 |
| 2001/0012271 A1* | 8/2001 | Berger | ................ | H04L 12/5602 370/230 |
| 2005/0003794 A1* | 1/2005 | Liu | ................... | H04W 52/0216 455/355 |
| 2006/0094436 A1* | 5/2006 | Kim | ................... | H04W 72/085 455/450 |
| 2007/0171858 A1* | 7/2007 | Grandhi | ............. | H04W 74/002 370/328 |
| 2007/0191052 A1* | 8/2007 | Kneckt | ................ | H04W 52/04 455/522 |
| 2007/0254595 A1* | 11/2007 | Yoon | .................... | H04L 5/0057 455/67.14 |
| 2008/0112368 A1* | 5/2008 | Kwon | ............... | H04W 72/0406 370/336 |
| 2008/0144558 A1* | 6/2008 | Wentink | ............... | H04L 1/1664 370/311 |
| 2008/0233966 A1* | 9/2008 | Scheim | ................ | H04L 5/0023 455/452.1 |
| 2009/0022078 A1* | 1/2009 | Patterson | ............... | G01D 21/00 370/311 |
| 2009/0124301 A1* | 5/2009 | Raissinia | .......... | H04W 52/0216 455/574 |
| 2009/0154436 A1* | 6/2009 | Choi | ................ | H04W 72/1242 370/338 |
| 2010/0195664 A1* | 8/2010 | Ho | ....................... | H04L 12/413 370/445 |
| 2010/0226317 A1* | 9/2010 | Horn | ..................... | H04W 16/10 370/329 |
| 2011/0075642 A1* | 3/2011 | Cordeiro | ........... | H04W 74/0816 370/338 |
| 2011/0200130 A1* | 8/2011 | Choi | ..................... | H04L 1/1614 375/260 |
| 2011/0255502 A1* | 10/2011 | Shen | .................. | H04W 72/1242 370/329 |
| 2012/0327829 A1* | 12/2012 | Sinha | ................ | H04W 72/0446 370/311 |
| 2013/0051293 A1* | 2/2013 | Wentink | ............ | H04W 52/0216 370/311 |
| 2014/0153503 A1* | 6/2014 | Srinivasan | .......... | H04W 72/082 370/329 |
| 2014/0153505 A1* | 6/2014 | Pantelidou | .......... | H04W 28/065 370/329 |
| 2014/0254449 A1* | 9/2014 | Wentink | ............ | H04W 52/0216 370/311 |
| 2015/0003377 A1* | 1/2015 | Wu | ....................... | H04W 74/08 370/329 |
| 2015/0156722 A1* | 6/2015 | Kim | ....................... | H04W 74/08 370/311 |
| 2015/0163028 A1* | 6/2015 | Tandra | .................. | H04L 5/0037 370/203 |
| 2015/0163753 A1* | 6/2015 | Valliappan | .......... | H04W 52/267 370/338 |
| 2015/0351031 A1* | 12/2015 | Wentink | ............ | H04W 52/0216 370/311 |
| 2015/0358786 A1* | 12/2015 | Kim | ...................... | H04L 12/189 370/311 |
| 2016/0007359 A1* | 1/2016 | Kim | .................. | H04W 28/0205 370/232 |
| 2016/0029373 A1* | 1/2016 | Seok | ...................... | H04L 5/0055 370/338 |
| 2016/0056930 A1* | 2/2016 | Seok | ...................... | H04L 5/0026 370/330 |
| 2016/0057657 A1* | 2/2016 | Seok | ...................... | H04L 69/324 370/476 |
| 2016/0073409 A1* | 3/2016 | Chen | ..................... | H04L 5/0037 370/329 |
| 2016/0100421 A1* | 4/2016 | Ding | ................. | H04W 72/1268 370/336 |
| 2016/0105836 A1* | 4/2016 | Seok | ...................... | H04W 36/32 370/331 |
| 2016/0143005 A1* | 5/2016 | Ghosh | ................ | H04W 72/042 370/329 |
| 2016/0143006 A1* | 5/2016 | Ghosh | ................ | H04W 74/004 370/329 |
| 2016/0173246 A1* | 6/2016 | Kenney | ................. | H04L 5/0044 370/329 |
| 2016/0174200 A1* | 6/2016 | Seok | ...................... | H04W 72/04 370/329 |
| 2016/0227565 A1* | 8/2016 | Ghosh | ............... | H04W 72/1268 |
| 2016/0242070 A1* | 8/2016 | Asterjadhi | ............ | H04L 5/0055 |
| 2016/0302232 A1* | 10/2016 | Ghosh | ............... | H04W 74/0833 |
| 2016/0338061 A1* | 11/2016 | Azizi | ..................... | H04W 84/12 |
| 2016/0345349 A1* | 11/2016 | Ferdowsi | .......... | H04W 72/1268 |
| 2016/0353253 A1* | 12/2016 | Cherian | ................... | H04W 4/06 |
| 2016/0353434 A1* | 12/2016 | Ghosh | ............... | H04W 72/0446 |
| 2016/0374093 A1* | 12/2016 | Asterjadhi | ........ | H04W 28/0278 |
| 2017/0195954 A1* | 7/2017 | Ghosh | ............... | H04W 52/0216 |
| 2017/0264354 A1* | 9/2017 | Ghosh | .................. | H04B 7/0626 |
| 2017/0265135 A1* | 9/2017 | Cariou | ............ | H04W 52/0219 |

\* cited by examiner

SCHEDULING TRIGGER FRAMES IN A HIGH EFFICIENCY WIRELESS LOCAL-AREA NETWORK

PRIORITY CLAIM

This application claims the benefit of priority under 35 USC 119(e) to U.S. Provisional Patent Application Ser. No. 62/167,379, filed May 28, 2015, which is incorporated herein by reference in their entirety.

TECHNICAL FIELD

Embodiments relate to Institute of Electrical and Electronic Engineers (IEEE) 802.11. Some embodiments relate to high-efficiency wireless local-area networks (HEWs). Some embodiments relate to IEEE 802.11ax. Some embodiments relate to scheduling trigger frames that respond to resource requests sent after a trigger frame that allows random access. Some embodiments relate to trigger frame for random access and cascade indications. Some embodiments relate to indicating when a trigger frame is schedule in response to request resource allocations.

BACKGROUND

Efficient use of the resources of a wireless local-area network (WLAN) is important to provide bandwidth and acceptable response times to the users of the WLAN. However, often there are many devices trying to share the same resources and the devices may interfere with one another. Additionally, often wireless devices have limited batteries. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
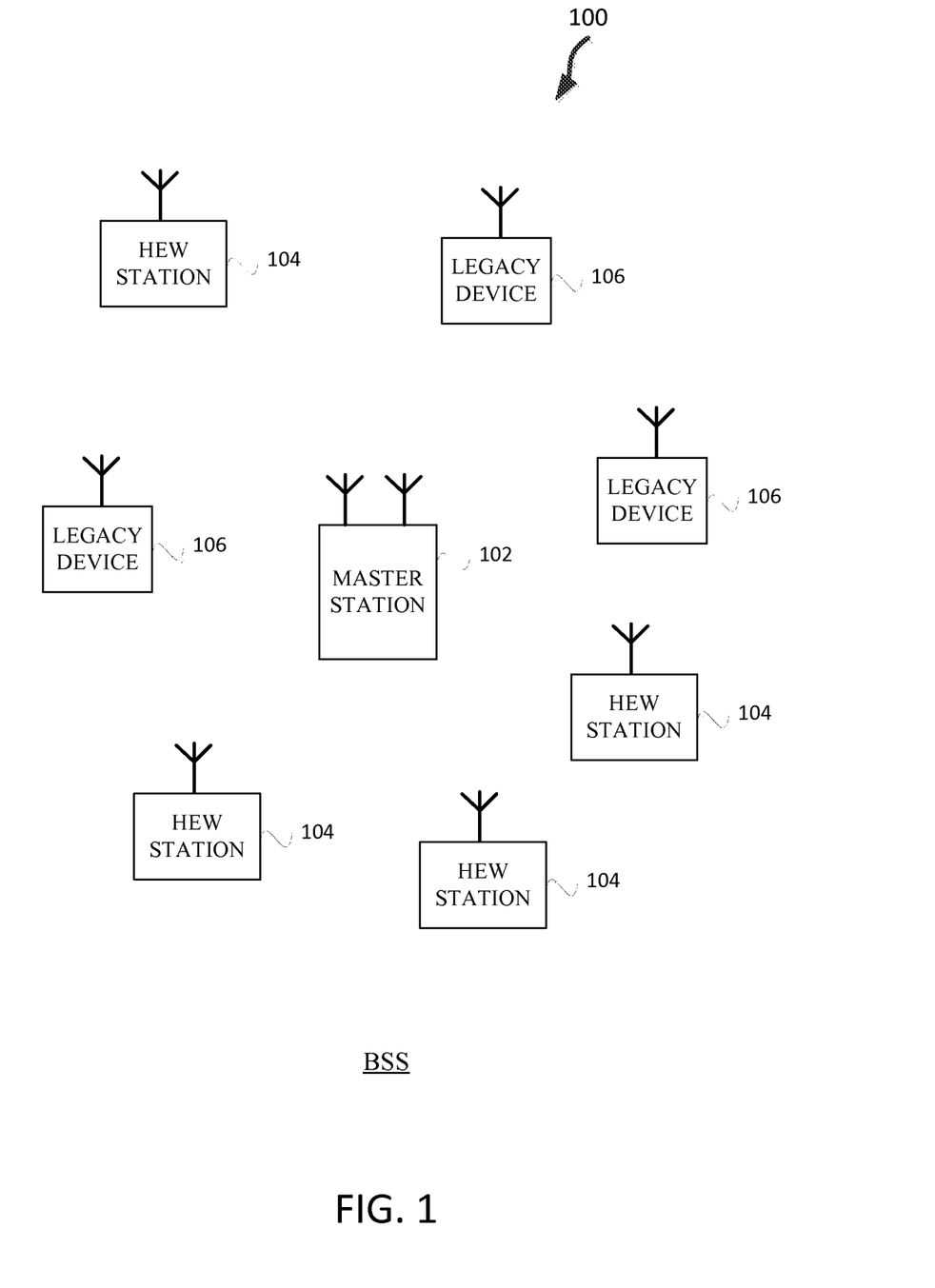
FIG. 1 illustrates a WLAN in accordance with some embodiments.

FIG. 1 illustrates a WLAN in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques.

In some embodiments, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some embodiments the bandwidth of the subchannels may be based on a number of active subcarriers. In some embodiments the bandwidth of the subchannels are multiples of 26 (e.g., 26, 52, 104, etc.) active subcarriers or tones that are spaced by 20 MHz. In some embodiments the bandwidth of the subchannels is 256 tones spaced by 20 MHz. In some embodiments the subchannels are multiple of 26 tones or a multiple of 20 MHz. In some embodiments a 20 MHz subchannel may comprise 256 tones for a 256 point Fast Fourier Transform (FFT).

A HEW frame may be configured for transmitting a number of spatial streams, which may be in accordance with MU-MIMO. In other embodiments, the master station 102, HEW STA 104, and/or legacy device 106 may also implement different technologies such as code division multiple access (CDMA) 2000, CDMA 2000 1X, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11 ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating.

In accordance with some embodiments, during the master-sync transmission the HEW STAs 104 may contend for the wireless medium with the legacy devices 106 being excluded from contending for the wireless medium during the master-sync transmission. In some embodiments the trigger frame may indicate an uplink (UL) UL-MU-MIMO and/or UL OFDMA control period.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW device 104 and/or the master station 102 are configured to perform the methods and functions herein described in conjunction with FIGS. 1-4.

Figure 2:
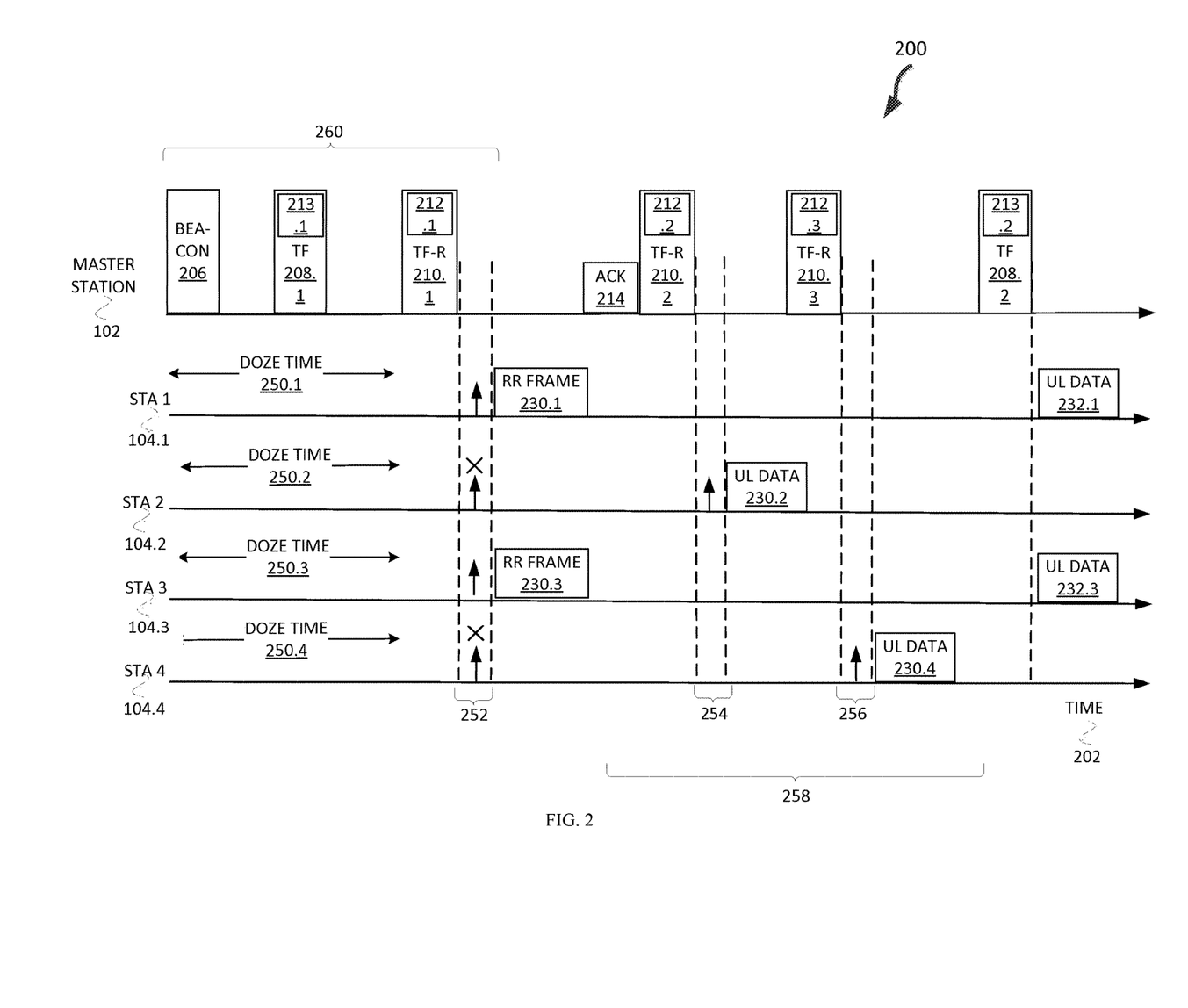
FIG. 2 illustrates the operation of a method for scheduling trigger frames in accordance with some embodiments.

FIG. 2 illustrates the operation of a method 200 for scheduling trigger frames 208 in accordance with some embodiments. Illustrated in FIG. 2 is time 202 along horizontal axes and frequency along vertical axes. In some embodiments, the method 200 begins with a master station 102 transmitting a beacon 206 frame. STA 1 104.1, STA 2 104.2, STA 3 104.3, and STA 4 104.4 are HEW STAs 104.

The method 200 continues with the master station 102 transmitting a trigger frame (TF) 208.1. In some embodiments, the TF 208 is a scheduling message that includes schedule 213 that indicates the STA identification, assigned sub-channels, and duration of access for one or more STAs 104. The TFs 208 may schedule resource using OFMDA and MU-MIMO. In some embodiments the master station 102 may transmit trigger frames for random access (TF-R) 210. The TF-R 210 may indicate resource units (RUs) such as subchannels and the STAs 104 may randomly contend for the RUs. In some embodiments the master station 102 may transmit multiple TFs 208 within a beacon interval and schedule one or more TF-Rs 210.

The method 200 continues with the master station 102 transmitting a TF-R 210.1. In some embodiments, the TF-R 210 may be cascaded with a cascade indication 212 of whether the cascade will continue. For example, cascade indication 212.1 and cascade indication 212.2 may indicate there are more TF-Rs 210. Cascade indication 212.3 may indicate there are not additional TF-Rs 210 following TF-R 210.3. For example, cascade indication 212.3 may be 1 and cascade indication 212.1, 212.2 may be zero. In some embodiments TF-R 210 may include an indication that a TF 208 is going to be the next frame transmitted by the master station 102 after any acknowledgment of frames transmitted to the master station 102 in response to the TF-R 210. The TF-Rs 210 and TFs 208 may be in accordance with the DensiFi Specification Framework Document (SFD).

The method 200 for the STAs may begin with the STAs 104 going into a power save mode for doze time 250. The STAs 104 may determine a doze time 250 based on the beacon 206 frame. The STAs 104 may respond to the TF-R 210.1 transmitted by the master station 102 by randomly generating a backoff count that may be decremented for each RU indicated in the TF-R 210.

As illustrated at 252, STA 1 104.1 transmitted a resource request (RR) frame 230.1; STA 2 104.2 had a collision so it was not able to transmit a frame; STA 3 104.3 transmitted a RR frame 230.3; and, STA 4 104.4 had a collusion so it was not able to transmit a frame.

For STA 1 104.1 and STA 3 104.3 they sent a RR frame 230 to the master station 102 and are waiting for a resource allocation in a TF 208. STA 1 104.1 and STA 2 104.2 may wait a waiting time period 258. In some embodiments, the STA 1 104.1 and STA 3 104.3 will not have information when the TF 208.2 is going to be transmitted so STA 1 104.1 and STA 3 104.3 will continue to receive and decode frames, e.g. TF-R 210.2 and TF-R 210.3, when it may be unnecessary for STA 1 104.1 and STA 3 104.3 to receive and decode frames that are not the TF 208.2.

The method 200 may continue with the master station 102 transmitting an acknowledgment (ack) 214. In some embodiments, the ACK 214 may be the BACK 300 described in conjunction with FIG. 3. For example, the ACK 214 may include an indication of when TF 208.2 is going to be transmitted and, in some embodiments, indicate that the schedule 213.2 will include resources for STA 1 104.1 and STA 3 104.3. In some embodiments the ACK 214 will include an indication for each STA 104 when the TF 208.2 will be transmitted. In some embodiments the ACK 214 will include an indication when the TF 208.2 is going to be transmitted for all STA 104 that have transmitted a RR frame that has been acknowledgement by the master station 102.

The method 200 continues with the master station 102 transmitting a TF-R 210.2. The cascade indication 212.2 may indicate there is another TF-R 210.2. STA 2 104.2 may have randomly gained an RU and transmitted UL data 230.2. STA 2 104.2 did not request additional resources in an RR frame. The master station 102 may transmit an ACK to the UL data 230.2 which is not illustrated.

The method 200 continues with the master station 102 transmitting TF-R 210.3. The cascade indication 212.3 may indicate that this is the last TF-R 210.3 In some embodiments, TF-R 210.3 may include an indication that the next frame after any acknowledgements transmitted by the master station 102 will be a TF 208. STA 4 104.4 may have randomly gained an RU and transmitted UL data 230.4. STA 4 104.4 did not request additional resources in an RR frame.

The master station 102 may transmit an ACK to the UL data 230.2 which is not illustrated.

The method 200 continues with the master station 102 transmitting TF 208.2. The schedule 213.2 may include resources in response to RR frames 230.1 and 230.3. STA 1 104.1 is allocated resources in response to the RR frame 230.1 and transmits UL DATA 232.1 in accordance with the schedule 213.2. STA 3 104.3 is allocated resources in response to the RR frame 230.3 and transmit UL data 232 in accordance with the schedule 213.2. The master station 102 acknowledges the UL data 232.1 and UL data 232.3, but this is not illustrated.

The method 200 may have the technical effect of saving power for STAs 104. For example, a STA 104 may request resource from the master station 102. The master station 102 may indicate when a next TF 208 is to be transmitted that will include resources allocated to the STA 104 in response to the resource request from the STA 104. The STAs 104 may go into a power save mode until the time of the TF 208 and thus save power.

Figure 3:
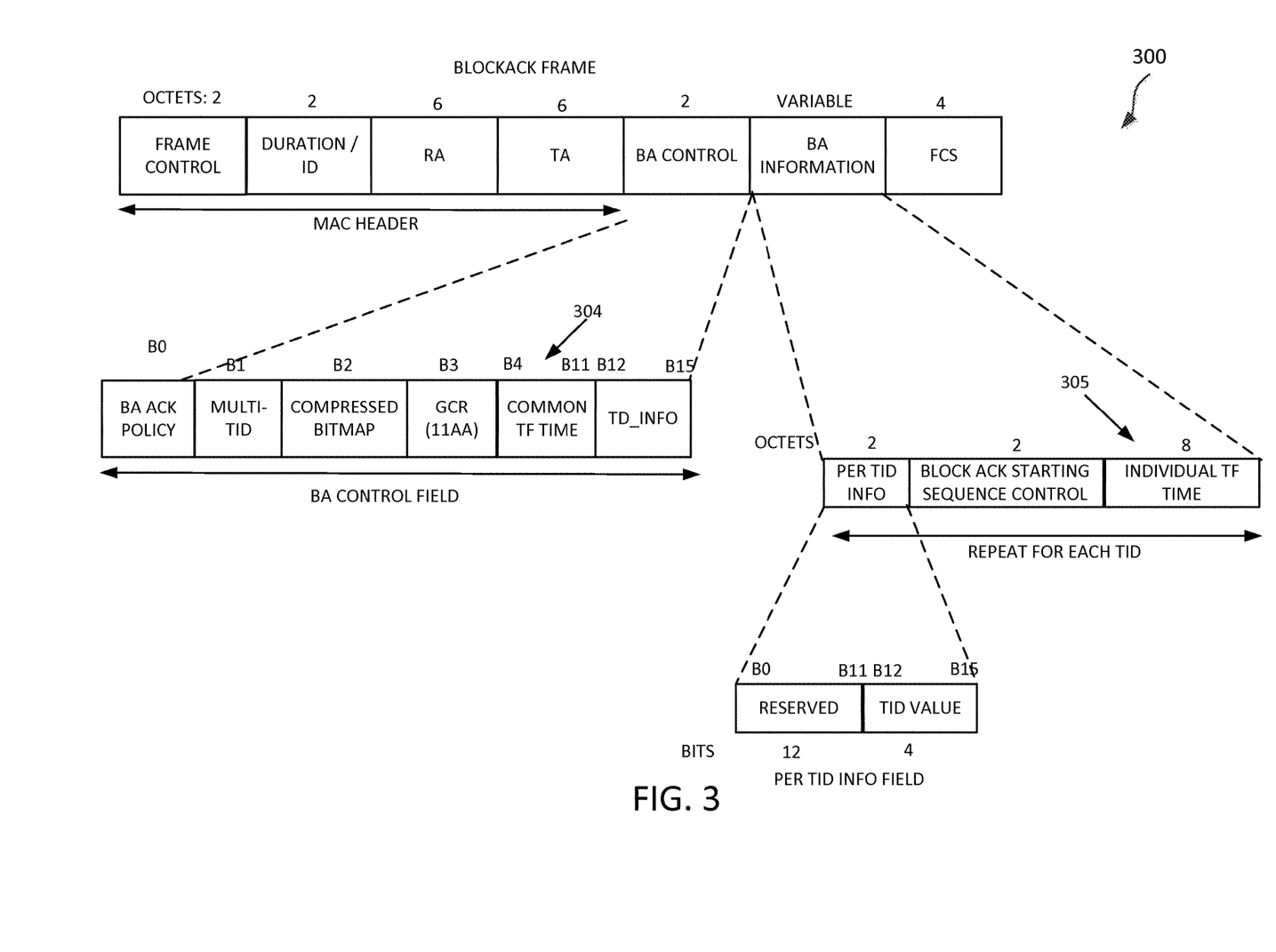
FIG. 3 illustrates a block acknowledge (BACK or BA) in accordance with some embodiments.

FIG. 3 illustrates a block acknowledge (BACK or BA) in accordance with some embodiments. The BACK 300 may be transmitted by a master station 102 in response to UL frames received from STAs, for example, as ACK 214 of FIG. 2. In some embodiments BACK 300 may be a multi-STA block BA/ACK.

In some embodiments a common TF time 304 may be indicated with 7 reserved bits (B4-B10) in the BA control field of a multi-traffic identification (TID) BA. The common TF time 304 may indicate a common trigger frame transmission time for all successful STAs. For example, common TF time 304 may indicate a time when a TF will be transmitted. The TF may include resource allocations for STAs that successfully transmitted resource requests to the master station. For example, referring to FIG. 2, TF may include resource allocations in schedule 213.2 for STA 1 104.1 (in response to RR frame 230.1) and STA 3 104.3 (in response to RR frame 230.3). The common TF time 304 may be indicated by a different portion of a packet.

In some embodiments, an individual TF time 305 may be indicated with 7 of the least significant bits of the BA bitmap in the BA information field of a mult-TID BA. The individual TF time 305 may indicate a trigger frame transmission time for each STA. For example, referring to FIG. 2, individual TF time 305 would refer to when TF 208.2 is transmitted for STA 1 104.1 (in response to RR frame 230.1) and for STA 3 104.3 (in response to RR frame 230.3). The individual TF time 305 may provide more flexibility in that different TFs 208 could be used to satisfy resource requests. For example, individual TF time 305 in ACK 214 for RR frame 230.1 may indicate the time for TF 208.2 for STA 1 104.1 (in response to RR frame 230.1), and individual TF time 305 in ACK 214 for RR frame 230.3 may indicate a time for a TF 208.3 (not illustrated, but after TF 208.2) for STA 3 104.3 (in response to RR frame 230.3). This may enable the master station 102 to accommodate more requests.

The BA bitmap may be able to be used since the master station 102 may be only acknowledging one packet per STA. For example, ACK 214 is acknowledging RR frame 230.1 and RR frame 230.3. The individual TF time 305 may be indicated by a different portion of a packet.

Figure 4:
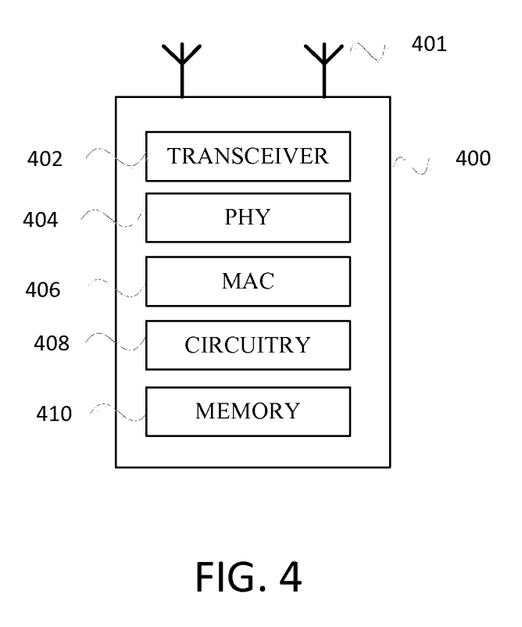
FIG. 4 illustrates a HEW device in accordance with some embodiments.

FIG. 4 illustrates a HEW device 400 in accordance with some embodiments. HEW device 400 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 400 may be suitable for operating as master station 102 (FIG. 1) or a HEW STA 104 (FIG. 1). In accordance with embodiments, HEW device 400 may include, among other things, a transmit/receive element 401 (for example an antenna), a transceiver 402, physical (PHY) circuitry 404, and media access control (MAC) circuitry 406. PHY circuitry 404 and MAC circuitry 406 may be HEW compliant layers and may also be compliant with one or more legacy IEEE 802.13 standards. MAC circuitry 406 may be arranged to configure packets such as a physical layer convergence procedure (PLCP) protocol data unit (PPDUs) and arranged to transmit and receive PPDUs, among other things. HEW device 400 may also include circuitry 408 and memory 410 configured to perform the various operations described herein. The circuitry 408 may be coupled to the transceiver 402, which may be coupled to the transmit/receive element 401. While FIG. 4 depicts the circuitry 408 and the transceiver 402 as separate components, the circuitry 408 and the transceiver 402 may be integrated together in an electronic package or chip.

In some embodiments, the MAC circuitry 406 may be arranged to contend for a wireless medium during a contention period to receive control of the medium for the HEW control period and configure an HEW PPDU. In some embodiments, the MAC circuitry 406 may be arranged to contend for the wireless medium based on channel contention settings, a transmitting power level, and a CCA level.

The PHY circuitry 404 may be arranged to transmit the HEW PPDU. The PHY circuitry 404 may include circuitry for modulation/demodulation, upconversion/downconversion, filtering, amplification, etc. In some embodiments, the circuitry 408 may include one or more processors. The circuitry 408 may be configured to perform functions based on instructions being stored in a RAM or ROM, or based on special purpose circuitry. The circuitry 408 may include processing circuitry and/or transceiver circuitry in accordance with some embodiments. The circuitry 408 may include a processor such as a general purpose processor or special purpose processor. The circuitry 408 may implement one or more functions associated with transmit/receive elements 401, the transceiver 402, the PHY circuitry 404, the MAC circuitry 406, and/or the memory 410.

In some embodiments, the circuitry 408 may be configured to perform one or more of the functions and/or methods described herein and/or in conjunction with FIGS. 1-4.

In some embodiments, the transmit/receive elements 401 may be two or more antennas that may be coupled to the PHY circuitry 404 and arranged for sending and receiving signals including transmission of the HEW packets. The transceiver 402 may transmit and receive data such as HEW PPDU and packets that include an indication that the HEW device 400 should adapt the channel contention settings according to settings included in the packet. The memory 410 may store information for configuring the other circuitry to perform operations for configuring and transmitting HEW packets and performing the various operations to perform one or more of the functions and/or methods described herein and/or in conjunction with FIGS. 1-4.

In some embodiments, the HEW device 400 may be configured to communicate using OFDM communication signals over a multicarrier communication channel. In some embodiments, HEW device 400 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 400 may use 4x symbol duration of 802.11n or 802.11ac.

In some embodiments, an HEW device 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 401 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 400 to perform the methods and/or operations described herein.

The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The following examples pertain to further embodiments. Example 1 is an apparatus of a high-efficiency wireless local-area network (HEW) master station. The apparatus including transceiver circuitry and processing circuitry configured to transmit a random access trigger frame (TF-R) to a plurality of HEW stations, receive resource requests from one or more of the plurality of HEW stations in response to the TF-R, and transmit an indication of when a trigger frame is to be transmitted. The trigger frame comprises resource allocations in response to the resource requests, and the resource allocations comprise a sub-channel and a duration of a transmission opportunity.

In Example 2, the subject matter of Example 1 can optionally include where an acknowledgement in response to the resource requests comprises the indication of when the trigger frame is to be transmitted.

In Example 3, the subject matter of Example 1 or Example 2 can optionally include where the acknowledgment is a multi-station block acknowledgement.

In Example 4, the subject matter of any of Examples 1-3 can optionally include where the indication when the trigger frame is to be transmitted is one or more times for each of the one or more of the plurality of HEW stations.

In Example 5, the subject matter of any of Examples 1-4 can optionally include where the indication when the trigger frame is to be transmitted is a schedule transmitted once per acknowledgment frame.

In Example 6, the subject matter of any of Examples 1-5 can optionally include where the TF-R comprises a cascade indication that indicates whether another TF-R is to follow the TR-R.

In Example 7, the subject matter of any of Examples 1-6 can optionally include where the indication when the trigger frame is to be transmitted is an indication in the TF-R that indicates a next frame to be transmitted after an acknowledgment is to be the trigger frame.

In Example 8, the subject matter of any of Examples 1-7 can optionally include where the transceiver circuitry and processing circuitry are configured to receive the resource requests from the one or more of the plurality of HEW stations in response to the TF-R in accordance with orthogonal frequency division multiple access (OFDMA).

In Example 9, the subject matter of any of Examples 1-8 can optionally include where the TF-R comprises an indication of one or more resource units and a duration of a random access transmission opportunity.

In Example 10, the subject matter of any of Examples 1-9 can optionally include where the transceiver circuitry and processing circuitry is configured to receive uplink data from HEW stations of the plurality of HEW stations in accordance with orthogonal frequency division multiple access (OFDMA), and where the indication when a trigger frame is to be transmitted further comprises acknowledgements of the uplink data from the HEW stations.

In Example 11, the subject matter of any of Examples 1-10 can optionally include where the indication when the trigger frame is to be transmitted is a time for the one or more HEW stations to set a network allocation vector.

In Example 12, the subject matter of any of Examples 1-11 can optionally include memory coupled to the transceiver circuitry and processing circuitry, and one or more antennas coupled to the transceiver circuitry and processing circuitry.

Example 13 is a non-transitory computer-readable storage medium that stores instructions for execution by one or more processors, the instructions to configure the one or more processors to cause a high-efficiency wireless local-area network (HEW) master station to: transmit a random access trigger frame (TF-R) to a plurality of HEW stations, receive resource requests from one or more of the plurality of HEW stations in response to the TF-R, and transmit an indication of when a trigger frame is to be transmitted. The trigger frame comprises resource allocations in response to the resource requests.

In Example 14, the subject matter of Examples 14 can optionally include where an acknowledgement in response to the resource requests comprises the indication when the trigger frame is to be transmitted.

In Example 15, the subject matter of Examples 13 or 14 can optionally include where the acknowledgment is a multi-station block acknowledgement.

In Example 16, the subject matter of any of Examples 13-15 can optionally include where the indication when the trigger frame is to be transmitted is transmitted for each of the one or more of the plurality of HEW stations.

Example 17 is an apparatus of a high-efficiency wireless local-area network (HEW) station. The apparatus including transceiver circuitry and processing circuitry configured to receive a random access trigger frame (TF-R) that indicates one or more resource units (RUs) and a number of time slots for the one or more RUs, set a backoff count based on the TF-R, contend for a RU based on the backoff count, transmit a resource request in accordance with the RU, and receive an indication when a trigger frame is to be transmitted in response to the resource request. The trigger frame comprises a resource allocation in response to the resource request. The resource allocation comprises a sub-channel and a duration of a transmission opportunity.

In Example 18, the subject matter of Example 17 can optionally include where the transceiver circuitry and processing circuitry are configured to enter a power save mode after receipt of the TF-R and remain in PS mode until the trigger frame is to be transmitted.

In Example 19, the subject matter of Examples 17 or 18 can optionally include where the transceiver circuitry and processing circuitry are configured to: receive an acknowledgement in response to the resource request. The acknowledgement may comprise the indication when the trigger frame is to be transmitted.

In Example 20, the subject matter of any of Examples 17-19 can optionally include where the TF-R comprises a cascade indication that indicates whether another TF-R is to follow the TR-R.

In Example 21, the subject matter of any of Examples 17-20 can optionally include where the indication when the trigger frame is to be transmitted is an indication in the TF-R that indicates a next frame to be transmitted after an acknowledgment is to be the trigger frame.

In Example 22, the subject matter of any of Examples 17-21 can optionally include where the transceiver circuitry and processing circuitry is configured to transmit the resource request to a HEW master station in accordance with orthogonal frequency division multiple access (OFDMA).

In Example 23, the subject matter of any of Examples 17-22 can optionally include memory coupled to the transceiver circuitry and processing circuitry; and, one or more antennas coupled to the transceiver circuitry and processing circuitry.

Example 24 is a method performed by a high-efficiency wireless local-area network (HEW) master station, the method including transmitting a random access trigger frame (TF-R) to a plurality of HEW stations, receiving resource requests from one or more of the plurality of HEW stations in response to the TF-R, and transmitting an indication when a trigger frame is to be transmitted, wherein the trigger frame is to comprise resource allocations in response to the resource requests, the resource allocations comprising a sub-channel and a duration of a transmission opportunity.

In Example 25, the subject matter of Example 24 can optionally include where an acknowledgement in response to the resource requests comprises the indication when the trigger frame is to be transmitted.

Example 26 is an apparatus of a high-efficiency wireless local-area network (HEW) master station. The apparatus including means for transmitting a random access trigger frame (TF-R) to a plurality of HEW stations, means for receiving resource requests from one or more of the plurality of HEW stations in response to the TF-R, and means for transmitting an indication of when a trigger frame is to be transmitted. The trigger frame comprises resource allocations in response to the resource requests. The resource allocations comprise a sub-channel and a duration of a transmission opportunity.

In Example 27, the subject matter of Example 26 can optionally include where an acknowledgement in response to the resource requests comprises the indication of when the trigger frame is to be transmitted.

In Example 28, the subject matter of Example 27 can optionally include where the acknowledgment is a multi-station block acknowledgement.

In Example 29, the subject matter of any of Examples 26-28 can optionally include where the indication when the trigger frame is to be transmitted is one or more times for each of the one or more of the plurality of HEW stations.

In Example 30, the subject matter of any of Examples 26-29 can optionally include where the indication when the trigger frame is to be transmitted is a schedule transmitted once per acknowledgment frame.

In Example 31, the subject matter of any of Examples 26-30 can optionally include where the TF-R comprises a cascade indication that indicates whether another TF-R is to follow the TR-R.

In Example 32, the subject matter of any of Examples 26-31 can optionally include where the indication when the trigger frame is to be transmitted is an indication in the TF-R that indicates a next frame to be transmitted after an acknowledgment is to be the trigger frame.

In Example 33, the subject matter of any of Examples 26-32 can optionally include means for receiving the resource requests from the one or more of the plurality of HEW stations in response to the TF-R in accordance with orthogonal frequency division multiple access (OFDMA).

In Example 34, the subject matter of any of Examples 25-33 can optionally include where the TF-R comprises an indication of one or more resource units and a duration of a random access transmission opportunity.

In Example 35, the subject matter of any of Examples 26-34 can optionally include means for receiving uplink data from HEW stations of the plurality of HEW stations in accordance with orthogonal frequency division multiple access (OFDMA), and wherein the indication when a trigger frame is to be transmitted further comprises acknowledgements of the uplink data from the HEW stations.

In Example 36, the subject matter of any of Examples 26-35 can optionally include where the indication when the trigger frame is to be transmitted is a time for the one or more HEW stations to set a network allocation vector.

In Example 37, the subject matter of any of Examples 26-36 can optionally include means for transmitting and receiving radio frequency signals and means for processing radio frequency signals.

Example 38 is an apparatus of a high-efficiency wireless local-area network (HEW) station. The apparatus including means for receiving a random access trigger frame (TF-R) that indicates one or more resource units (RUs) and a number of time slots for the one or more RUs, means for setting a backoff count based on the TF-R, means for contending for a RU based on the backoff count, means for transmitting a resource request in accordance with the RU, and means for receiving an indication when a trigger frame is to be transmitted in response to the resource request. The trigger frame comprises a resource allocation in response to the resource request. The resource allocation comprises a sub-channel and a duration of a transmission opportunity.

In Example 39, the subject matter of Examples 38 can optionally include means for entering a power save mode after receipt of the TF-R and remain in PS mode until the trigger frame is to be transmitted.

In Example 40, the subject matter of Examples 38 or 39 can optionally include means for receiving an acknowledgement in response to the resource request, wherein the acknowledgement comprises the indication when the trigger frame is to be transmitted.

In Example 41, the subject matter of any of Examples 38-40 can optionally include where the TF-R comprises a cascade indication that indicates whether another TF-R is to follow the TR-R.

In Example 42, the subject matter of any of Examples 38-41 can optionally include where the indication when the trigger frame is to be transmitted is an indication in the TF-R that indicates a next frame to be transmitted after an acknowledgment is to be the trigger frame.

In Example 43, the subject matter of any of Examples 38-42 can optionally include means for transmitting the resource request to a HEW master station in accordance with orthogonal frequency division multiple access (OFDMA).

In Example 44, the subject matter of any of Examples 38-43 can optionally include means for transmitting and receiving radio frequency signals coupled to means for processing radio frequency signals.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) master station, the apparatus comprising:
    memory; and, transceiver circuitry and processing circuitry coupled to the memory, the transceiver circuitry and the processing circuitry configured to:
    configure the HE master station to transmit a first trigger frame (TF) to a plurality of HE stations, the first TF indicating one or more uplink resource allocations for multiuser random access, the one or more uplink resource allocations for random access comprising information indicating a sub-channel and a duration, and wherein the first TF comprises: a first indication of whether a second TF is to be transmitted after the first TF and a second indication of when the second TF is to be transmitted; and decode responses from one or more of the plurality of HE stations in response to the first TF and in accordance with the one or more uplink resource allocations for multiuser random access.

2. The apparatus of claim 1, wherein an acknowledgement in response to the responses comprises the second indication of when the second TF is to be transmitted.

3. The apparatus of claim 2, wherein the acknowledgment is a multi-station block acknowledgement.

4. The apparatus of claim 1, wherein the second indication of when the second TF is to be transmitted is a schedule.

5. The apparatus of claim 1, wherein the first indication is a cascade indication that indicates whether another TF is to follow the first TF.

6. The apparatus of claim 1, wherein the second indication of when the second TF is to be transmitted is an indication in the first TF that indicates a next trigger frame is to be transmitted after an acknowledgment in response to the responses is transmitted.

7. The apparatus of claim 1, wherein the processing circuitry is configured to receive the responses, the responses comprising resource requests from the one or more of the plurality of HE stations in response to the first TF in accordance with orthogonal frequency division multiple access (OFDMA).

8. The apparatus of claim 1, wherein the first TF comprises a duration of a random access transmission opportunity.

9. The apparatus of claim 1, wherein the processing circuitry is configured to receive uplink data from the one or more HE stations of the plurality of HE stations in accordance with orthogonal frequency division multiple access (OFDMA) and in accordance with the one or more uplink resource allocation for random access.

10. The apparatus of claim 1, wherein the second indication of when the second TF is to be transmitted comprises a time for the one or more HE stations to set a network allocation vector.

11. The apparatus of claim 1 further comprising:
    transceiver circuitry coupled to the memory; and, one or more antennas coupled to the transceiver circuitry.

12. A non-transitory computer-readable storage medium that stores instructions for execution by one or more processors, the instructions configure the one or more processors to cause a high-efficiency (HE) master station to:
    configure the HE master station to transmit a first trigger frame (TF) to a plurality of HE stations, the first TF indicating one or more uplink resource allocations for multiuser random access, the one or more uplink resource allocations for random access comprising information indicating a sub-channel and a duration, and wherein the first TF comprises: a first indication of whether a second TF is to be transmitted after the first TF, and a second indication of when the second TF is to be transmitted; and
    decode responses from one or more of the plurality of HE stations in response to the first TF and in accordance with the one or more uplink resource allocations for multiuser random access.

13. The non-transitory computer-readable storage medium of claim 12, wherein an acknowledgement in response to the responses comprises the indication of when the second TF is to be transmitted.

14. The non-transitory computer-readable storage medium of claim 12, wherein the acknowledgment is a multi-station block acknowledgement.

15. An apparatus of a high-efficiency (HE) station, the apparatus comprising:
    memory; and, processing circuitry coupled to the memory, the processing circuitry configured to:

receive a first trigger frame (TF) for random access that indicates one or more resource units (RUs) for uplink random access, a first indication of whether a second TF is to be transmitted after the first TF, and a second indication of when the second TF is to be transmitted; and;

set a backoff count based on a number of the one or more RUs for uplink random access;

contend for a RU based on the backoff count; and transmit a packet in accordance with the RU.

16. The apparatus of claim 15, wherein the processing circuitry is configured to enter a power save mode after receipt of the the first TF and remain in power save (PS) mode until the second TF is to be transmitted.

17. The apparatus of claim 15, wherein the processing circuitry is configured to:

receive an acknowledgement in response to the packet.

18. The apparatus of claim 15, wherein the first indication is a cascade indication that indicates whether another TF is to follow the first TF.

19. The apparatus of claim 15, wherein the second indication of when the second trigger frame is to be transmitted is an indication in the first TF that indicates a next trigger frame is to be transmitted after an acknowledgment is received for the packet.

20. The apparatus of claim 15, wherein the processing circuitry is configured to transmit the resource request to a HE access point in accordance with orthogonal frequency division multiple access (OFDMA).

21. The apparatus of claim 15 further comprising: transceiver circuitry coupled to the memory; and, one or more antennas coupled to the transceiver circuitry.

22. A method performed by a high-efficiency (HE) access point, the method comprising:

configuring the HE access point to transmit a first trigger frame (TF) to a plurality of HE stations, the first TF indicating one or more uplink resource allocations for multiuser random access, the one or more uplink resource allocations for random access comprising information indicating a sub-channel and a duration, wherein the first TF comprises a first indication of whether a second TF is to be transmitted after the first TF and a second indication of when the second TF is to be transmitted; and decoding responses from one or more of the plurality of HE stations in response to the first TF and in accordance with the one or more uplink resource allocations for multiuser random access.

23. The method of claim 22, wherein an acknowledgement in response to the responses comprises the indication of when the second TF is to be transmitted.

* * * * *